Oct. 22, 1940.    M. M. BORDEN    2,219,220
PIEZOMETER CONNECTION
Filed March 9, 1938

Inventor:—
Moro M. Borden
by his Attorneys
Howson & Howson

Patented Oct. 22, 1940

2,219,220

UNITED STATES PATENT OFFICE 2,219,220

PIEZOMETER CONNECTION

Moro M. Borden, Philadelphia, Pa., assignor to Simplex Valve and Meter Company, Philadelphia, Pa., a corporation of Delaware Application March 9, 1938, Serial No. 194,974

5 Claims. (Cl. 73—211)

This invention relates to piezometers, and more particularly to a piezometer construction and arrangement especially adapted for use with sewage lines and the like.

An important object of the invention is to provide means, preferably controllable from a distance, through which the piezometer can be periodically cleaned, since piezometers used with sewage lines are often clogged by the dirt and greases contained in the line and, accordingly, provide a faulty response at the meter with which they are connected. The collection of dirt and grease at the piezometer mouth occurs not only in the mouth of the piezometer but likewise upon the surface of the tube about the mouth of the piezometer, and for this reason a further purpose of the invention is the provision in a construction of this character of an arrangement whereby the inner surface of the conduit about the piezometer may be cleansed.

A further object of the invention is the provision of means whereby the dirt and grease from the conduit may be held against entrance into the meter connection proper.

A still further object of the invention is the provision in a construction of this character of an arrangement whereby the piezometer may be very readily removed and cleaned.

These and other objects I attain by the construction shown in the accompanying drawing wherein, for the purpose of illustration I have shown a preferred embodiment of my invention and wherein.

Figure 1:
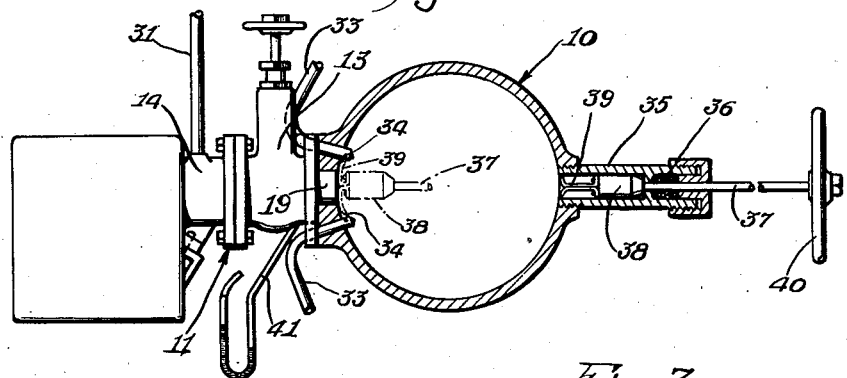
Fig. 1 is a sectional view through a sewage conduit having a piezometer and cleaning means therefor in accordance with my invention.
Figure 3:
Fig. 3 is an end elevation of the piezometer proper.
Figure 2:
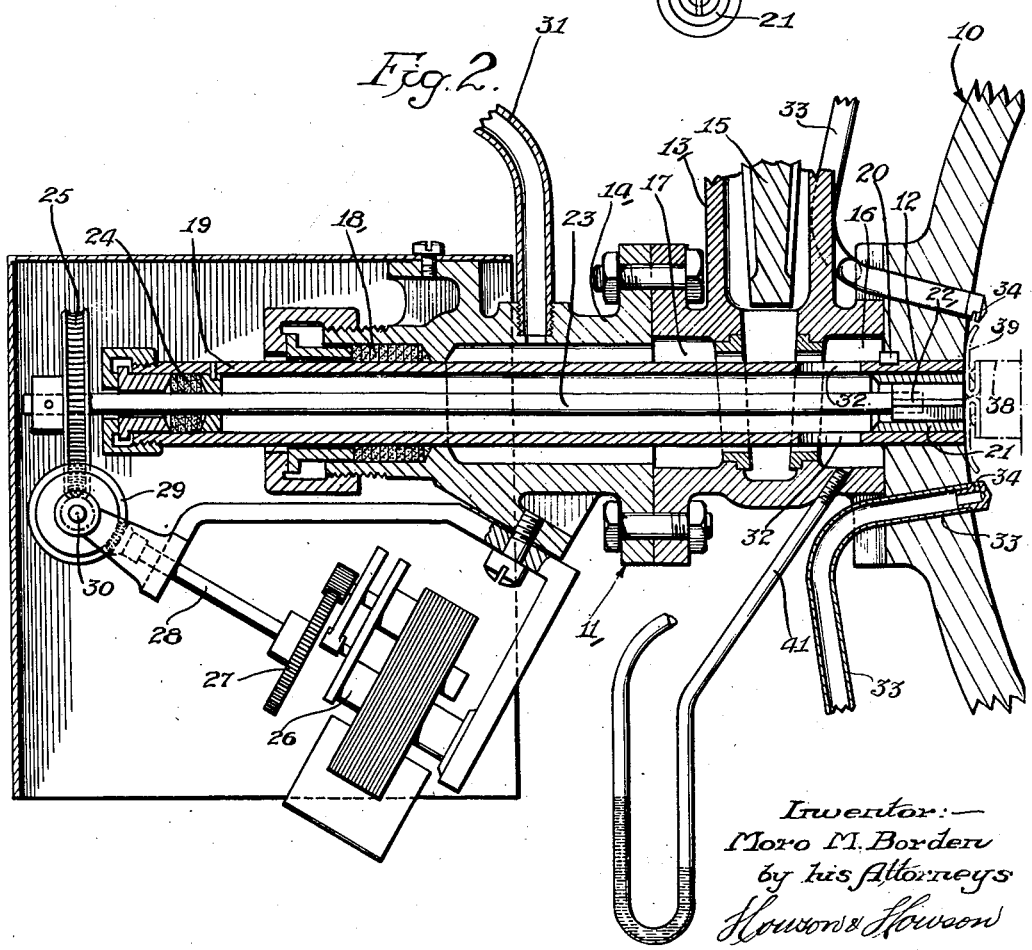
Fig. 2 is an enlarged detail sectional view through a piezometer constructed in accordance with my invention.

Referring now more particularly to the drawing, the numeral 10 designates a conduit for sewage or the like, and 11, a casing secured to the conduit about an opening 12 formed therein. The casing 11 comprises inner and outer sections 13 and 14, the inner section consisting of a valve casing the valve 15 of which, when in its seated position, divides the inner section into inner and outer chambers 16 and 17. The outer end of the outer section 14 of the casing is formed with a packing gland 18 through which is slidably directed a tube 19. The inner end of this tube fits within the opening 12 and has its inner terminus flush with the inner surface of the conduit wall, and is held against rotation as by means of a key 20 or the like. This inner end of the tube is bushed as at 21, the bushing likewise having its inner end flush with the inner surface of the conduit wall and having rotatable therein a scraper 22 at present shown as comprising a plurality of radial sections. These sections are carried by a shaft 23 extending through a packing box 24 at the outer end of tube 19 and at the exterior the shaft is equipped with a worm gear 25. This worm gear is driven from motor 26 through gearing 27, shaft 28, gearing 29 and shaft 30 bearing a worm for coaction therewith. Motor 26 may be controlled from any suitable point.

The casing 11 has a larger internal diameter than tube 19, and clean water may be introduced to the space between the tube and casing through a conduit 31. Under ordinary circumstances the rate at which water is introduced to the conduit 31 need only be sufficient to cause a slight flow into the main conduit 10, the water entering the interior of tube 19 through openings 32. When it is desired to flush the system, the flow through conduit 31 may be increased to the desired extent.

It has been noted, as above suggested, that there is a tendency to formation of a ridge about the edge of a piezometer upon the surface of the main conduit wall, and to insure against and to assist in removing this collection I provide flushing tubes 33 which extend through the conduit wall adjacent the opening 12 and have slots 34 directing fluid entering through the flushing tubes 33 across the mouth of the piezometer. To further assist in removal of any such collection, I provide at the opposite side of the conduit 10 a casing 35 including a packing gland 36 guiding a rod 37. This rod has at its inner end a scraper 38 at present shown as of the squeegee type having flexible plates 39 which may spread against the wall of the tube about the piezometer and scrape any foreign material therefrom. The rod 37 is equipped with any suitable means for shifting the same diametrically of the conduit and for rotating the same after it arrives at its cleaning position, such means being at present shown as a hand-wheel 40.

A meter connection to the piezometer may be made at any point in the wall of the casing inwardly of packing gland 18. Preferably, however, this connection is made at the inner chamber of the inner section of the casing, as illustrated at 41, in order that the meter connection may not be disturbed when valve 15 is closed.

It will be obvious that at any time that the piezometer is in need of cleaning this may be accomplished by placing motor 26 in operation and supplying a flushing flow through the conduit 31 and flushing tubes 33. If the use of the flushing tubes proves insufficient at any time to prevent collection about the mouth of the piezometer, this collection may be removed by scraper 38.

Should the tube or scraper at any time require repair, this may be readily accomplished by withdrawing the tube and scraper through the valve which in part forms the inner casing section and closing the valve, following which the outer casing section may be removed for any necessary repairs without interrupting operation of the meter.

Since the construction illustrated is, obviously, capable of considerable modification without departing from the spirit of my invention, I do not wish to be understood as limiting myself thereto except as hereinafter claimed.

I claim:

1. In combination with a conduit for the flow of sewage or the like, a piezometer communicating therewith and having its inner end flush with the inner wall of the conduit, a scraper rotatable in and normally disposed in the inner end of the piezometer, said piezometer comprising a tube slidably engaged in an opening in the conduit wall, a casing surrounding the inner end of the tube having at its outer end a packing gland through which the outer end of the tube extends and having its inner end in sealing engagement with the conduit wall, a valve for segregating the inner end of the casing from the remainder thereof, a packing gland at the outer end of the tube, and means including a shaft extending through the packing gland of the tube and engaged with said scraper to operate the same.

2. In combination with a conduit for the flow of sewage or the like, a piezometer communicating therewith and having its inner end flush with the inner wall of the conduit, a scraper rotatable in and normally disposed in the inner end of the piezometer, means to direct clean water through the piezometer to the conduit, said piezometer comprising a tube slidably engaged in an opening in the conduit wall, a casing surrounding the inner end of the tube having at its outer end a packing gland through which the outer end of the tube extends and having its inner end in sealing engagement with the conduit wall, a valve for segregating the inner end of the casing from the remainder thereof, a packing gland at the outer end of the tube, and means including a shaft extending through the packing gland of the tube and engaged with said scraper to operate the same.

3. In combination with a conduit for the flow of sewage or the like, a piezometer communicating therewith and having its inner end flush with the inner wall of the conduit, a scraper rotatable in the inner end of the piezometer, means to direct a flushing current of clean water over the inner surface of the conduit about the inner end of the piezometer, said piezometer comprising a tube slidably engaged in an opening in the conduit wall, a casing surrounding the inner end of the tube having at its outer end a packing gland through which the outer end of the tube extends and having its inner end in sealing engagement with the conduit wall, a valve for segregating the inner end of the casing from the remainder thereof, a packing gland at the outer end of the tube, and means including a shaft extending through the packing gland of the tube and engaged with said scraper to operate the same.

4. In combination with a conduit for the flow of sewage or the like, a piezometer communicating therewith and having its inner end flush with the inner wall of the conduit, a scraper rotatable in the inner end of the piezometer, means to direct clean water through the piezometer to the conduit, means to direct a flushing current of clean water over the inner surface of the conduit about the inner end of the piezometer, said piezometer comprising a tube slidably engaged in an opening in the conduit wall, a casing surrounding the inner end of the tube having at its outer end a packing gland through which the outer end of the tube extends and having its inner end in sealing engagement with the conduit wall, a valve for segregating the inner end of the casing from the remainder thereof, a packing gland at the outer end of the tube, and means including a shaft extending through the packing gland of the tube and engaged with said scraper to operate the same.

5. In combination with a conduit for the flow of sewage or the like, a piezometer communicating therewith and having its inner end flush with the inner wall of the conduit, means to direct a flushing current of clean water over the inner surface of the conduit about the inner end of the piezometer, said piezometer comprising a tube slidably engaged in an opening in the conduit wall, a casing having at its outer end a packing gland through which the outer end of the tube extends and having its inner end in sealing engagement with the conduit wall, and a valve for segregating the inner end of the casing from the remainder thereof.

MORO M. BORDEN.